United States Patent
Soni et al.

(10) Patent No.: US 11,095,589 B1
(45) Date of Patent: Aug. 17, 2021

(54) MESSAGE ANALYSIS FOR INFORMATION SECURITY

(71) Applicant: ACCENTURE GLOBAL SOLUTIONS LIMITED, Dublin (IE)

(72) Inventors: Soujanya Soni, Bangalore (IN); Kuntal Dey, Birbhum (IN); Jhilam Bera, Howrah (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

(21) Appl. No.: 17/121,114

(22) Filed: Dec. 14, 2020

(51) Int. Cl.
*H04L 12/58* (2006.01)
*G06F 21/60* (2013.01)
*H04L 29/06* (2006.01)

(52) U.S. Cl.
CPC .......... *H04L 51/14* (2013.01); *G06F 21/606* (2013.01); *H04L 51/12* (2013.01); *H04L 63/1408* (2013.01)

(58) Field of Classification Search
CPC ...... G06F 16/337; G06F 16/901; G06F 9/547; H04L 67/22; H04L 51/32; H04L 51/046; H04L 51/16; H04L 51/22; H04L 67/02; H04L 43/08
See application file for complete search history.

(56) References Cited

U.S. PATENT DOCUMENTS

| | | | |
|---|---|---|---|
| 7,912,908 B2 | 3/2011 | Cai et al. | |
| 10,200,379 B2 | 2/2019 | Richter et al. | |
| 10,467,678 B2 | 11/2019 | Mehta et al. | |
| 2012/0185797 A1* | 7/2012 | Thorsen | G06Q 10/00 715/784 |
| 2016/0094646 A1* | 3/2016 | Spivack | H04L 67/1042 709/204 |

OTHER PUBLICATIONS

Kuntal Dey et al., "A Paraphrase and Semantic Similarity Detection System for User Generated Short-Text Content on Microblogs", Proceedings of COLING 2016, the 26th International Conference on Computational Linguistics: Technical Papers, pp. 2880-2890, Osaka, Japan, Dec. 11-17, 2016.

Samuel Fernando et al., "A semantic similarity approach to paraphrase detection", Proceedings of the 11th annual reserch colloquium of the IK special interest group for computational linguistics, 2008, 7 pages.

Kuntal Dey et al., "A Paraphrase and Semantic Similarity Detection System for User Generated Short-Text Content on Microblogs", Dec. 11, 2016 pp. 2880-2890 (11 pages).

* cited by examiner

*Primary Examiner* — Hitesh Patel
(74) *Attorney, Agent, or Firm* — Mannava & Kang, P.C.

(57) ABSTRACT

A message analysis system controls the transmission of outgoing messages based on the contents of the outgoing messages so that the proliferation of restricted data or confidential content can be monitored or prevented. An outgoing message is detected via various user actions executed during the creation of the outgoing message. The contents of the outgoing message are extracted to determine if the outgoing message includes restricted data or content based on a comparison of the message contents with contents of an index which includes prior tagged messages and their message counts. If the contents of the outgoing message match a prior received message, an associated message count is updated and the outgoing message is transmitted or restricted based on the comparison of the updated message count with a corresponding count threshold.

19 Claims, 10 Drawing Sheets

MESSAGE ANALYSIS FOR INFORMATION SECURITY

BACKGROUND

The proliferation of digital user devices such as laptop computers, smartphones, etc., in addition to the rapid development of communication platforms such as social networks or messaging applications ("apps"), have enabled instantaneous communication and data sharing for people across the globe. The information generated at a particular location can be almost instantaneously conveyed across the globe to numerous users simultaneously via a click of a button. The information is conveyed not only in the traditional textual format but also via voice messages, photographs, or even videos. As a result, parties interested in circulating confidential information or restricted data among a select group of users may have to explicitly request the users in their messages to not circulate the confidential information outside of the select group.

BRIEF DESCRIPTION OF DRAWINGS

Features of the present disclosure are illustrated by way of examples shown in the following figures. In the following figures, like numerals indicate like elements, in which.

DETAILED DESCRIPTION

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

A message analysis system extracts contents of an outgoing message, compares the extracted contents of the outgoing message with contents of an index to determine if the outgoing message includes confidential information such as protected or restricted data meant for a selected group of users or for limited circulation. If it is determined based on the comparison, that the outgoing message includes confidential information, the transmission of the outgoing message to the message recipients may be restricted or even suppressed. The restriction of the outgoing message is implemented via a mechanism that automatically prevents the message recipients from forwarding confidential information included in the outgoing message or may enable circulation of the confidential information to a limited number of further message recipients so that the confidential information may not be circulated beyond the limited number of further message recipients.

In an example, the index can include messages that were previously received and which were tagged as including confidential information. Whenever a tagged message is received, the contents of the tagged messages are extracted. The contents extracted can include textual or non-textual data, the metadata such as the date and time at which the message was generated and/or received, and a message count along with a count threshold included in the message tag. The message count is the number of times the message has been forwarded in a particular message chain. For example, if a user forwards an original message generated by the user to three recipients, the initial message count can be set to three, while subsequent forwards of the message updates the message count accordingly. If a subsequent user forwards the message to two further message recipients, then the message count is updated to five. The updated message count is included in the message tag in addition to a count threshold. In case, the count threshold is set to four, then the further recipient may be able to forward the message to only one other recipient.

In an example, the message analysis system may be implemented in a user device so that different user actions associated with one or more applications may trigger monitoring of the outgoing message contents. When monitoring the message contents, the message analysis system may initially extract the outgoing message contents as keywords and compare the keywords with the keywords of the prior tagged messages stored in the index. The keywords can be extracted from outgoing messages of both textual and non-textual formats. In case one or more prior tagged messages are identified as messages similar to the outgoing message based on the keyword comparison, then the prior tagged messages are identified as candidate messages which are used for further analysis. Similarity can be determined using techniques such as cosine similarity and in comparison to a predetermined similarity threshold. In case no candidate messages are identified, the outgoing message may be transmitted without any restrictions.

The candidate messages which are identified as similar to the outgoing message based on the similarity threshold comparison are further analyzed. Initially, an identical message step can be implemented wherein string comparison is employed to identify if any of the candidate messages are identical to the outgoing message. If no identical messages are found, a sub-string message step can be implemented to determine if any of the candidate messages are sub-strings of the outgoing message. If no identical or sub-string messages are found, a semantic similarity step is implemented to determine if any of the candidate messages are semantically similar to the outgoing message. Again, semantic similarity is determined using paraphrase matching techniques and based on comparison with a semantic similarity threshold and if no semantically similar messages are identified, the outgoing message can be transmitted without restrictions.

If however, at least one of an identical message, a sub-string message, or a semantically similar message is identified, a message count associated with the corresponding identical, sub-string, or semantically similar message is updated. The updated message count is compared with a count threshold corresponding to the identical, sub-string, or a semantically similar message. If the updated message count is less than the count threshold then the updated message count is included as a tag with the outgoing message which is then transmitted to the message recipients. If the updated message count is greater than the count threshold, then the outgoing message is not transmitted to the message recipients.

The message analysis system as disclosed herein provides for a technical improvement in the domain of communication systems, and particularly for message transmission systems such as email systems, social media networks, messaging applications, etc., because it enables transmission of confidential information to limited recipients while automatically restricting the further proliferation of the confidential information. As discussed above, while a request may be included in accordance with the existing messaging systems that the message data is confidential, there is no automatic mechanism for further proliferation of confidential information so that the message recipients are disabled from forwarding the confidential information. The analysis of outgoing messages, the inclusion of message counts and count thresholds into the outgoing messages, and building up of the indexes in user devices and/or servers enables an automatic mechanism to restrict or even suppress message transmission thereby providing message transmission systems with automatic information proliferation controls.

Figure 1:
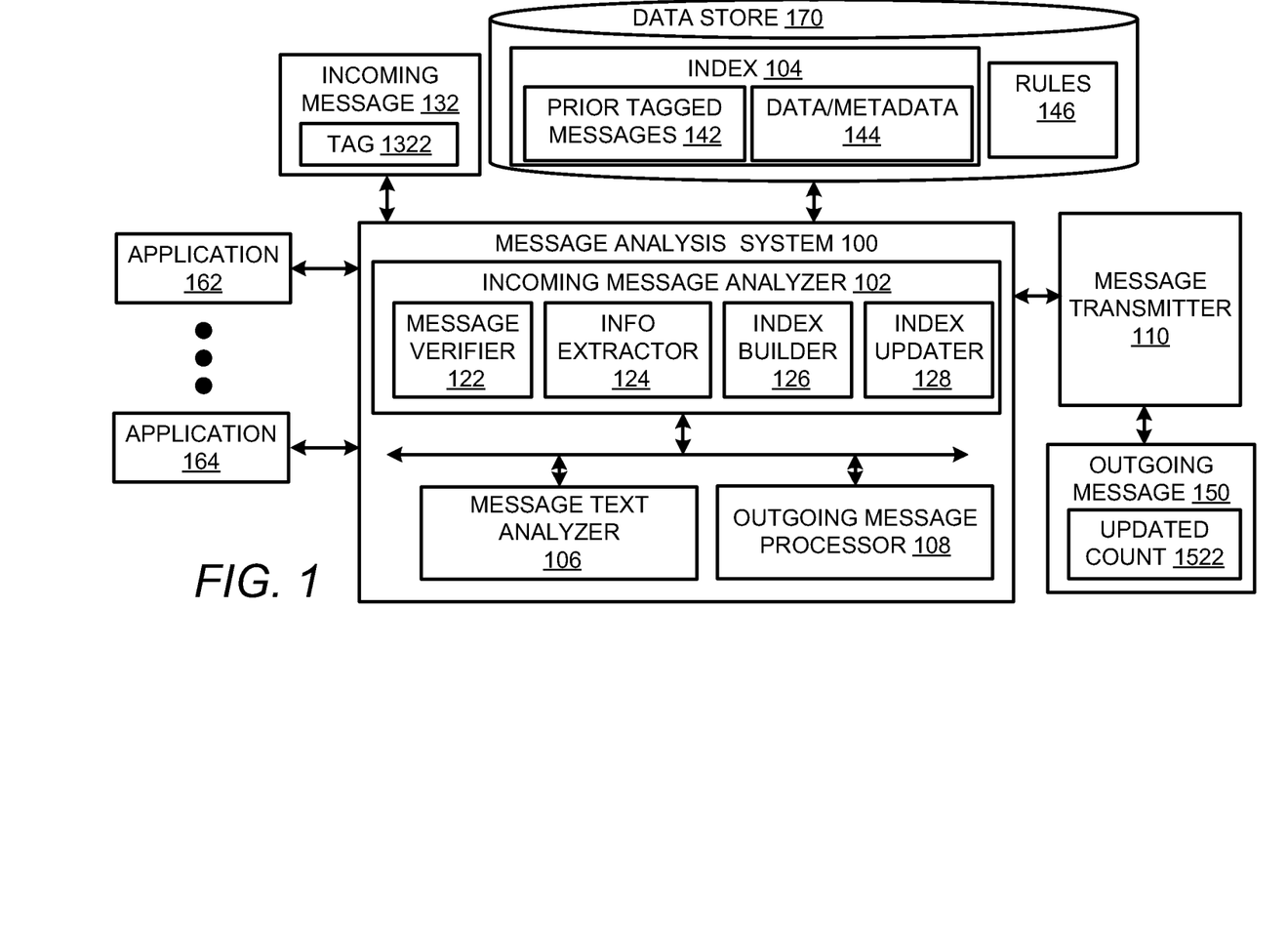
FIG. 1 shows a block diagram of a message analysis system in accordance with the examples disclosed herein.

FIG. 1 shows a block diagram of a message analysis system 100 in accordance with the examples disclosed herein. The message analysis system 100 includes an incoming message processor 102, an index 104, a message analyzer, and an outgoing message processor 108. In an example, the message analysis system 100 can be coupled to a data store 170 for storing data that is used in the message analysis operations. The message analysis system 100 detects when an outgoing message 150 is to be transmitted, verifies if the outgoing message 150 includes one or more keywords associated with protected content or confidential information. If the outgoing message 150 includes the keywords, the outgoing message 150 is further analyzed to determine if the outgoing message 150 includes the protected content and various actions are executed based on the extent of protected content included in the outgoing message 150. The keywords associated with the protected content and the extent of protected content included in the outgoing message 150 can be determined based on a comparison of the outgoing message 150 with the contents of the index 104. The index 104 includes prior tagged messages 142 that were previously received with tags indicative of the presence of confidential content or protected content therewithin and as a result, further proliferation or transmission of these tagged messages is restricted. The index 104 further includes data/metadata 144 associated with the tagged messages such as keywords, phrases, and sentences extracted from the prior tagged messages 142, formats of the incoming messages i.e., whether a particular incoming message was of textual or non-textual format, etc. The index 104 can further include alternate forms such as synonyms, lemmatized words, etc. of the content included in the prior tagged messages 142. In an example, the index 104 can be implemented as a database. In other examples, the index 104 can also be implemented as a table, spreadsheet, text file, or other data storage structure.

Whenever a new incoming message is received via one or more applications 162, . . . 164, the incoming message processor 102 of the message analysis system 100 accesses and analyzes the incoming message 132 to determine if the incoming message 132 includes protected or confidential content. The determination regarding the protected content in the incoming message 132 can be made by the message verifier 122 based on the inclusion of a tag in the incoming message 132. In an example, the operating system (OS) of a computing device executing the message analysis system 100 can access the tag 1322 of the incoming message 132, wherein the tag 1322 includes the number of times the incoming message was forwarded or the number of copies of the incoming message 132 that were created in the direct line preceding the current copy of the incoming message 132. Furthermore, the tag 1322 also includes a threshold number of copies or forwards of the incoming message that are allowed. Upon identifying the tag 1322 in the incoming message 132, an info extractor 124 extracts the data and metadata of the message contents (including any attachments of incoming email messages) for storage to the index 104. The data can include the individual words, the phrases and/or sentences extracted from the incoming message 132. The metadata can include synonyms or lemmatized versions of the words from the incoming message 132, sentiments associated with the incoming message 132, etc. In an example, the incoming message 132 may be a message with a textual format or non-textual format such as an image, a voice message, etc. Regardless of the format of the incoming message 132, the info extractor 124 may provide the incoming message 132 to the message text analyzer 106 for extraction of the aforementioned data/metadata of the incoming message 132. The incoming message processor 102 further includes an index builder 126 that stores the incoming message 132 and the data along with the metadata to the index 104. As the data may not be stored indefinitely in a storage device such as that of a user device, the index updater 128 can be configured to automatically delete the messages and the data from the index 104 periodically.

The outgoing message 150 is processed by the outgoing message processor 108 to determine if the keywords from the index 104 are included therein. The outgoing message 150 can be provided to the message transmitter 110 for transmission to one or more message recipients if no keywords from the index 104 are included therein. The message recipients can include one or more members of an organization wherein the outgoing message 150 is an email message or the message recipients can include members of a private group on a social networking platform such as a messaging application or the recipients may include members of a group that subscribes to receive messages via multicasting, etc. In an example, the message analysis system 100 can be configured with rules 146 that include the various thresholds, etc., that are to be implemented for various operations. In an example, rules 146 can include a predetermined number of keywords to be present in outgoing messages to flag the messages for further analysis. In an example, the rules 146 may be automatically configured based on the applications 162, . . . , 164 associated with the thresholds. If a sufficient number of keywords, i.e., above the predetermined number are included in the outgoing message 150, then the outgoing message 150 is further analyzed by the outgoing message processor 108 to determine if there is a matching prior tagged message in the index 104 so that the count in the tag associated with the prior matching message can be updated. Various matching techniques as detailed further herein are employed to identify the matching, prior, tagged message from the index 104. When the prior message is identified, the count tag is updated (i.e., the updated count 1522) to reflect the additional count due to the outgoing message 150 and included in the outgoing message 150. The updated count is compared with a count threshold which specifies the number of copies of the prior message that are permitted to be transmitted. If the updated count 1522 exceeds the count threshold, it implies that a sufficient number of the copies have already been generated and that no more copies of the prior message can be generated. It may be noted that the prior message may have the count threshold set to zero so that no more copies of the prior message can be generated. If the updated count is below the count threshold, it implies that copies of the prior message can be generated and circulated. Therefore, the outgoing message 150 including the tag with the updated count 1522 is provided to the message transmitter 110 for transmission to the message recipients. The message tag can be included in the meta-information of the message/file in any of the agreed-upon standard formats. The message transmitter 110 may or may not be included in the message analysis system 100 in accordance with different examples.

In an example, the message analysis system 100 can be executed by a user device that includes the plurality of applications 162, ..., 164, used to receive and send out the messages. The messages received and sent by the user device are analyzed by the message analysis system 100 to build the index 104 or to employ the index 104 in determining if the messages include confidential/protected content tagged for restricted transmission. In an example, the message analysis system 100 can be executed at the operating system level on a server e.g., a corporate server wherein policies can be commonly implemented across various communication applications such as emails, messengers, SMS communications, etc.

Figure 2:
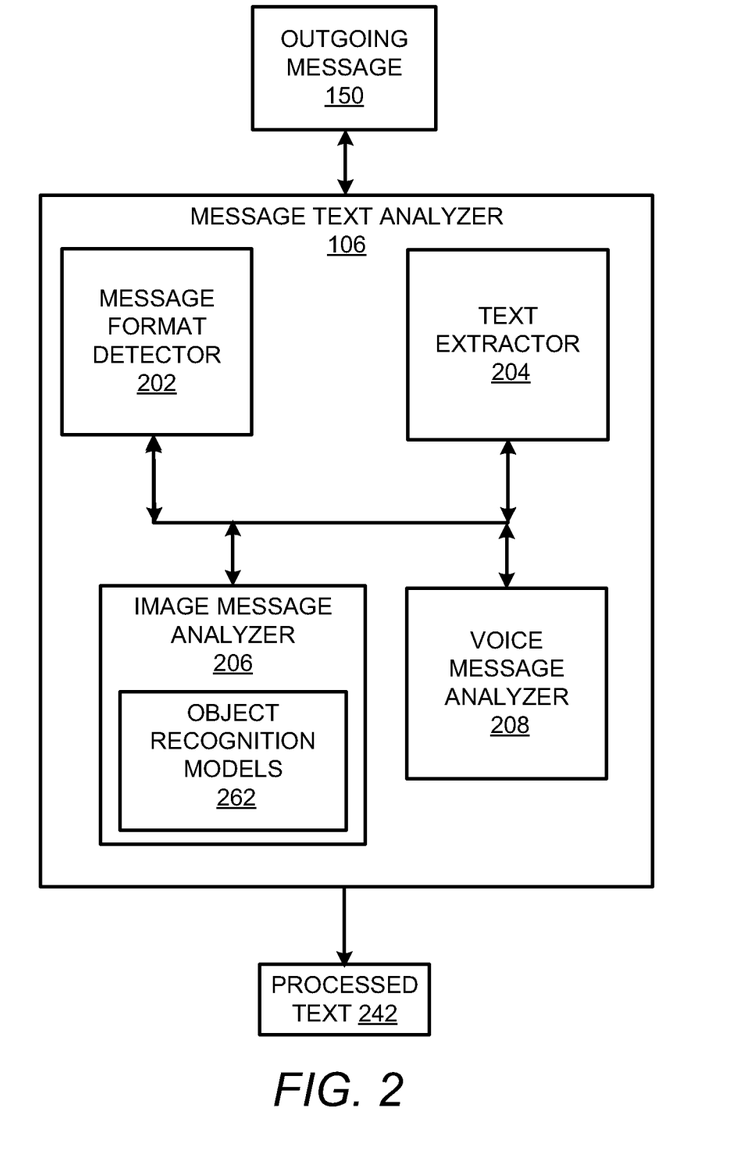
FIG. 2 shows a block diagram of a message text analyzer in accordance with the examples disclosed herein.

FIG. 2 shows a block diagram of the message text analyzer 106 in accordance with the examples disclosed herein. As mentioned above, the message text analyzer 204 can be configured to extract text from the incoming and outgoing messages of different formats such as text messages, messages having an image format such as screenshots, videos, etc., and voice messages. Accordingly, the message text analyzer 106 includes a message format detector 202, a text extractor 204, an image message analyzer 206, and a voice message analyzer 208. The message format detector 202 initially accesses and determines the format of a given message and related contents of the given message (e.g., attachments of an email message or embedded contents of the email message). When analyzing the incoming message 132, the info extractor 124 may provide the incoming message 132 and its related contents such as attachments to the message text analyzer 106 for text extraction. In an example, the message format detector 202 can determine the message and the related content format based on file extensions. For example, a message/related content with a text-based file extension is determined to be a text file while a file with .img, .png, .jpg, etc., is determined to be a still image such as a photograph or a screenshot, while a file with extensions such as, .mp4, mov, .wmv, etc. are identified as video files while the files with extensions such as .mp3, .wav, etc., are determined to be voice files. Depending on the file extensions the outgoing message 150 can be further processed. If the outgoing message 150/related content is a textual file, then it is provided directly to the text processor 204 to obtain the processed text 242. If the outgoing message 150 and/or its related content is a non-textual file, then it is processed by one of the image message analyzer 206 or the voice message analyzer 206 for the text extraction.

The image message analyzer 206 accesses still images and uses object recognition models 262 such as convolutional neural networks (CNNs) to identify if the image file of the outgoing message 150 includes textual or non-textual objects. If it is determined that the image file includes textual objects then the object recognition models 262 further enable outputting the text included in the image file. For example, the image message analyzer 206 can employ OCR for text extraction. If the message being analyzed includes a video file, the image message analyzer 206 can be further configured to convert any voice input from the video file into textual output using voice to text application programming interfaces (APIs). If no voice input is detected from the video file, the video file can be processed as one or more still images and the object recognition models 262 and OCR can be applied for text extraction. Similarly, the voice message analyzer 208 can include voice to text APIs for extracting text from voice messages. In an example, the text extracted by the image message analyzer 206 and the voice message analyzer 208 can be further processed by the text processor 204 for removal of punctuation, stop words, etc., and for outputting as the processed text 242.

Figure 3:
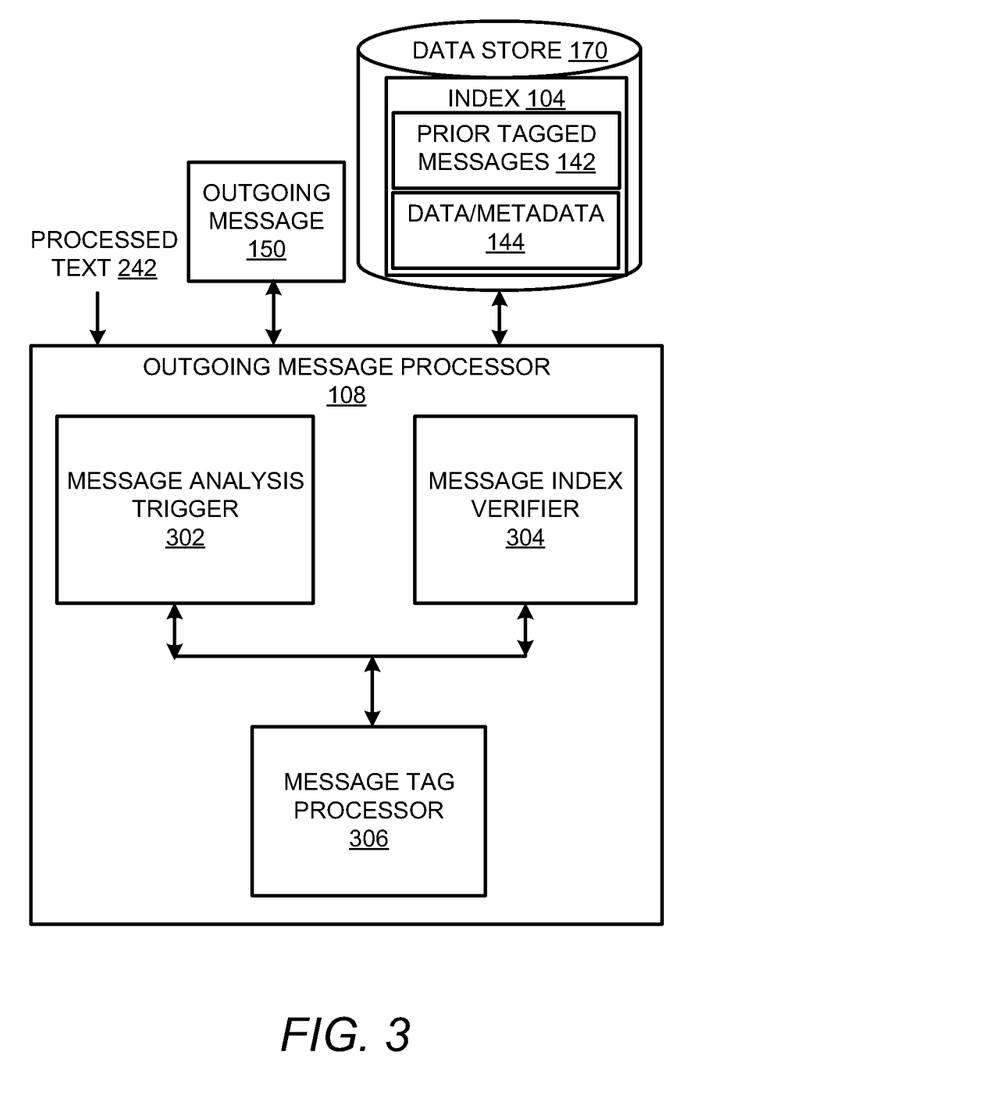
FIG. 3 shows a block diagram of an outgoing message processor in accordance with the examples disclosed herein.

FIG. 3 shows a block diagram of the outgoing message processor 108 in accordance with the examples disclosed herein. The outgoing message processor 108 includes a message analysis trigger 302, a message index verifier 304, and a message tag processor 306. The message analysis trigger 302 detects whenever a message e.g., the outgoing message 150 is generated for transmission to one or more recipients. The outgoing message 150 can be generated by any of the plurality of applications 162, ..., 164, for transmission. The outgoing message 150 can be generated by one of the various modalities, such as but not limited to, forwarding a prior message, copying the content from the prior message into a new message, typing the text from the prior message into the new message, capturing a screenshot of the prior message or capturing an image of the prior message displayed on another user device to generate an image-based new message or even activating a mike icon in one of the applications to read out the textual content of the prior message to generate a new voice message, etc. The message analysis trigger 302 detects when the outgoing message 150 is prepared by one of the above-mentioned modalities and transmits a signal to the message text analyzer 106 to analyze the text of the outgoing message 150 and thereby enabling an index lookup. The message text analyzer 106 parses the outgoing message 150 to extract words and/or sentences. As mentioned above, the message text analyzer 106 can be configured to extract text not only from messages in textual format but also from image-based messages, voice-based messages, video messages, etc. The message text analyzer 106 may further process the extracted words to remove punctuation, stop words, etc. The processed text 242 which includes the extracted words, sentences, or the entire textual content of the outgoing message 150 is accessed by the message index verifier 304 to determine if matching content for the outgoing message 150 exists in the index 104 and the extent of match between the textual content of the processed text 242 and the contents of the index 104.

Different actions including the transmission of the outgoing message 150 or suppression/prevention of transmission of the outgoing message 150 can be implemented by the outgoing message processor 108 based on the extent of the similarity. If the similarity between the outgoing message 150 and the matching contents of the index 104 is greater than a predetermined threshold, then a tag coupled with the messages in the matching contents can be examined by the message tag processor 306. Based on the count of copies of the messages that were heretofore created, a tag with the updated count 1522 is generated by the message tag processor 306 and included into the outgoing message 150 Furthermore, the updated count 1522 is compared with a count threshold by the message tag processor 306 and provided to the message transmitter 110 for transmission to the message recipients if the updated count 1522 is below the count threshold.

Figure 4:
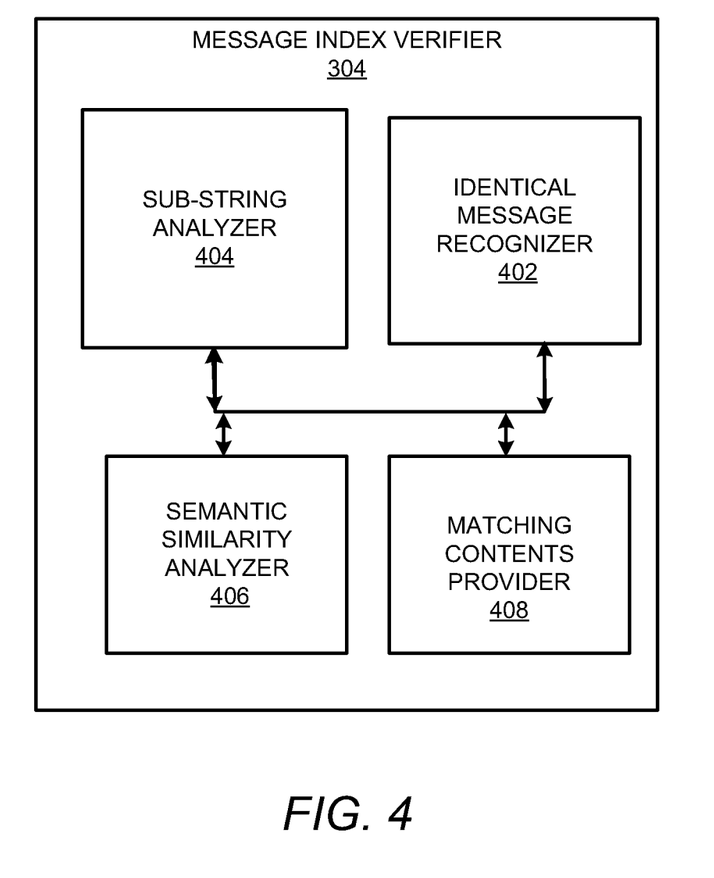
FIG. 4 shows a block diagram of a message index verifier in accordance with the examples disclosed herein.

FIG. 4 shows a block diagram of the message index verifier 304 in accordance with the examples disclosed herein. The message index verifier 304 includes an identical message recognizer 402, a sub-string analyzer 404, a semantic similarity analyzer 406, and a matching contents provider 408. Initially, the identical message recognizer 402 employs string matching techniques to determine if the outgoing message 150 is an exact match for any of the prior tagged messages 142. If no prior tagged messages are identical to the outgoing message 150, then the sub-string analyzer 402 is configured to select different substrings from the processed text 242 and check for matches with the contents of the index 104 using, for example, string matching techniques. The substrings can include portions of sentences from the textual content of the outgoing message 150. If a substring match is found such that a message is retrieved from the index 104 is a substring of the outgoing message 150 or the outgoing message 150 is a substring of the message retrieved from the index 104, the message count associated with the outgoing message 150 is incremented and based on a comparison with the corresponding count threshold, the outgoing message 150 may or may not be transmitted.

If no substring match is identified, the outgoing message 150 is further processed by the semantic similarity analyzer 406 to determine the semantic similarity between the outgoing message 150 and the contents of the index 104. In an example, the semantic similarity can be determined as a fractional value lying between 0 and 1 and/or a binary output of whether any of the index contents form paraphrases of the outgoing message 150. The semantic similarity analyzer 404 retrieves the permissible similarity threshold value from the rules 146 to compare the semantic similarity of the outgoing message 150 with the index contents. If the semantic similarity is greater than the permissible similarity threshold value, then the contents of the index can be provided as the matching contents so that the count associated with the outgoing message 150 is updated. The matching contents provider 406 outputs the matching contents of the index 104 as well as the corresponding extents of similarity so that the message tag processor 306 can determine if the count associated with the outgoing message 150 is to be updated.

Figure 5A:
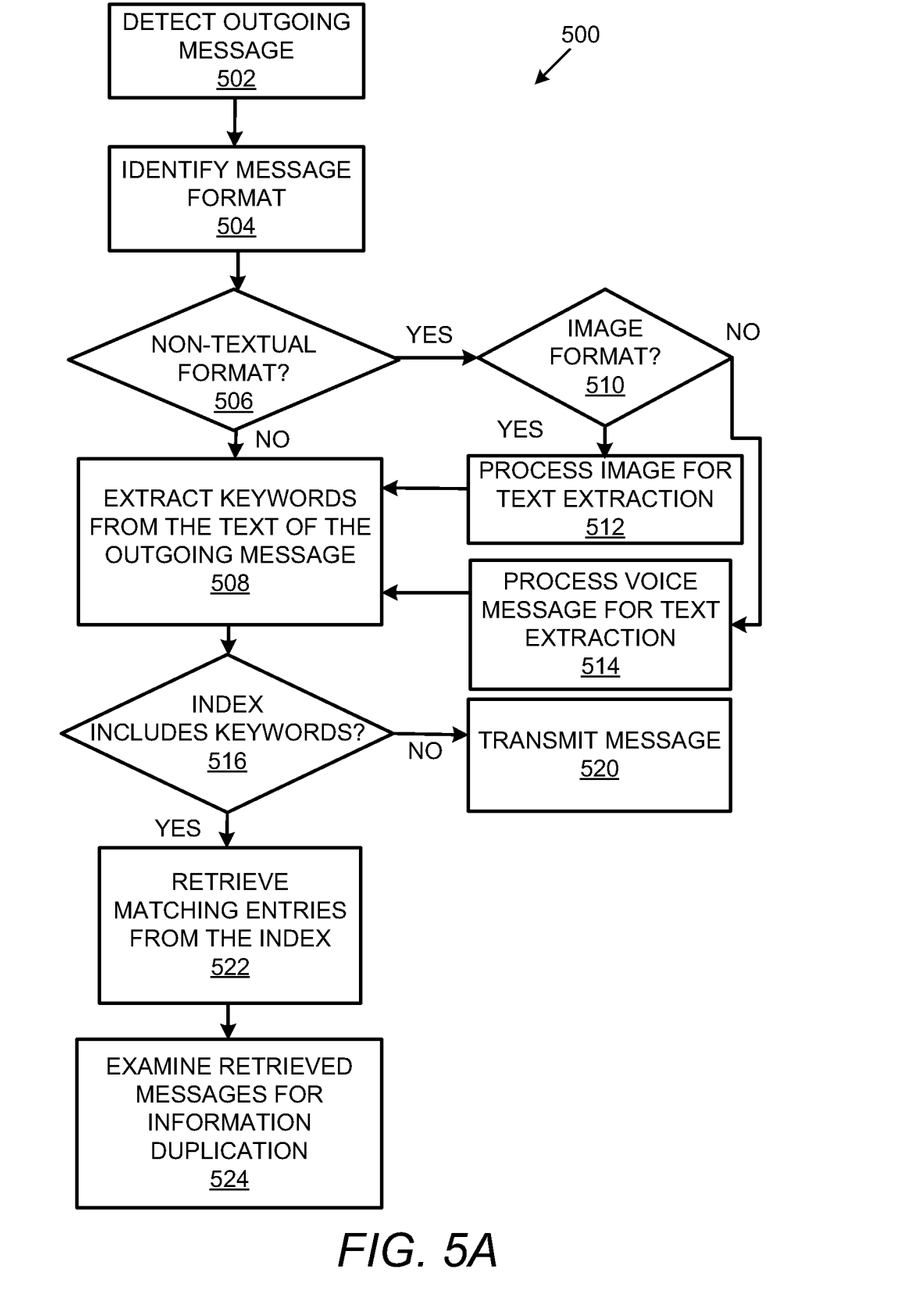
FIG. 5A shows a flowchart that details a method of processing messages that can include confidential information or protected data in accordance with examples disclosed herein.

FIG. 5A shows a flowchart 500 that details a method of processing messages that can include confidential information or protected data in accordance with examples disclosed herein. At 502, the outgoing message 150 which is prepared for transmission to one or more recipients is detected. The detection of the outgoing message for transmission in a user device can be based on at least two factors, one of which includes the user's actions, such as, typing, capturing screenshots, dictating, copy-paste operations, etc., and the second factor includes the application being used to execute the operations. For example, if a communication application such as an email application of a browser-based email, a messaging application, a social networking application, etc., is being used to execute the user's actions, then the extensions of the operating system of the user device, executing the application can be used for enabling the detection of the user's actions. If, however, a user action such as typing is executed via a word processing application, then such user actions may not be detected at 502. At 504, the message format of the outgoing message 150 is identified.

At 506, it is determined if the outgoing message 150 is of non-textual format. If it is determined at 506 that the message is of textual format, then the text of the outgoing message 150 may be processed at 508 by parsing, tokenizing, etc. to extract the keywords. If it is determined at 506 that the outgoing message 150 is of non-textual format, it is further determined at 510 if the outgoing message 150 is of image format. If yes, the image is processed at 512 for text extraction as described herein and the method proceeds to 508 for the extraction of keywords. If it is determined at 510 that the outgoing message 150 is not of image format, it is concluded that the outgoing message 150 is a voice message and therefore voice to text APIs are used at 514 for text extraction and the method proceeds to 508 for keyword extraction.

The incoming messages can also be received in different formats and may be processed upon receipt by the message text analyzer 106 as described herein from steps 504 to 508 for data/metadata extraction. The detailed method is not described herein for brevity.

At 516, it is determined if the index 104 includes keywords similar to the keywords extracted from the outgoing message 150, wherein the similarity exceeds a certain predetermined similarity threshold. In an example, the similarity threshold can be empirically determined. The similarity can be determined using cosine similarity between the words constituting the outgoing message 150 and the list of "index keywords." If at 516 if it is determined that there are no keywords in the index 104 which are similar to the words in the outgoing message 150 or that the similarity between the list of index keywords and the words in the message is below the similarity threshold, the message is transmitted at 520. If at 516 if it is determined that there are one or more keywords in the index 104 that are similar to the keywords extracted from the outgoing message 150, and the similarity exceeds the similarity threshold, the matching entries from the index 104 which can include the prior messages 142 and the data/metadata of the prior messages 142 the sufficiently match the outgoing message 150 are retrieved at 522. The messages retrieved at 522 are treated as candidate messages and processed for further examination for information duplication at 524 as detailed herein.

Figure 5B:
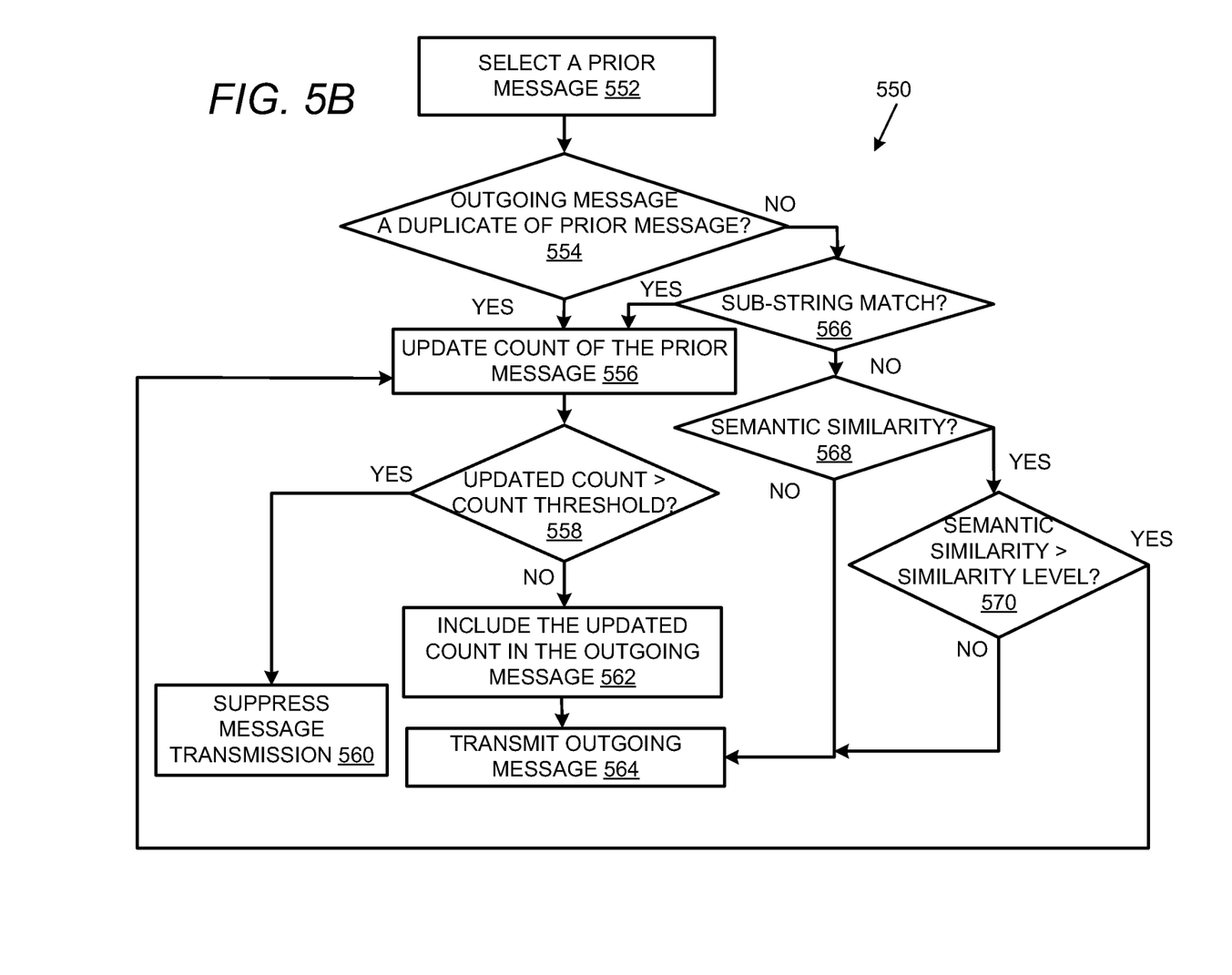
FIG. 5B shows a flowchart that details a method of examining the outgoing message for information duplication in accordance with the examples disclosed herein.

FIG. 5B shows a flowchart 550 that details a method of examining the outgoing message 150 for information duplication in accordance with the examples disclosed herein. At 552, one of the prior messages from the candidate messages is selected for further examination for information duplication. The selected prior message is compared with the outgoing message 150 using simple string-matching techniques to determine at 554 if the outgoing message 150 is a duplicate of the selected prior message. If it is determined at 554 that the selected prior message is a duplicate of the outgoing message 150, the count of the selected prior message is updated at 556 to include the outgoing message 150, and the updated count is compared with the count threshold at 558 to determine if the updated count is greater than the count threshold. If it is determined at 558 that the updated count is greater than the count threshold, the message transmission is suppressed at 560. If it is determined at 558 that the updated count is less than the count threshold, the updated count 1522 is included at 562 as a count tag in the outgoing message 150, and the outgoing message 150 is transmitted to the message recipients at 564.

If it is determined at 554 that the selected prior message is not a duplicate of the outgoing message 150, it is further determined at 566 if sub-string matches exist between the selected prior message and outgoing message 150, i.e., it is determined if the selected prior message is a substring of the outgoing message 150 or vice versa. If it is determined at 566 that the selected prior message is a substring of the outgoing message 150 or vice versa, the method returns to 556 to update the count, compare the updated count with the count threshold and transmit or suppress the outgoing message based on the comparison. If it is determined at 564 that the selected prior message is not a sub-string of the outgoing message 150, it is further determined at 566 if the selected prior message carries semantic similarity with the outgoing message 150. Various paraphrase matching techniques can be employed at 566 to determine the semantic similarity. One of the example techniques that can be employed for determining semantic similarity can include a feature-set driven approach where support vector machine (SVM) based machine learning (ML) is used. Different lexical, syntactic, semantic, and pragmatic features of the message pair including the selected prior message and the outgoing message 150 are used to label whether these two messages are paraphrases of each other. In an example, the semantic similarity scores are further obtained and thereby the semantic similarity labels are assigned. If it is determined at 568 that there is a semantic similarity between the selected prior message and the outgoing message 150, the semantic similarity is compared at 570 with an empirically-determined permissible level of similarity. If it is determined at 570 that the similarity is greater than the permissible similarity level it is implied that the outgoing message 150 may include confidential information or restricted data that was included in the index 104. Therefore, the method returns to 558 to update the count, compare the updated count with the count threshold, and transmit or suppress the outgoing message based on the comparison. If it is determined at 570 that the similarity is not than the permissible similarity level, then the message analysis system 100 is configured to determine that the outgoing message 150 does not include sufficient confidential information or restricted data that necessitates restricting its transmission. Therefore, the outgoing message 150 is transmitted to the message recipients at 562. Similarly, other prior messages from the index 104 can be to be compared with the outgoing message 150 for similarity determination.

Figure 6:
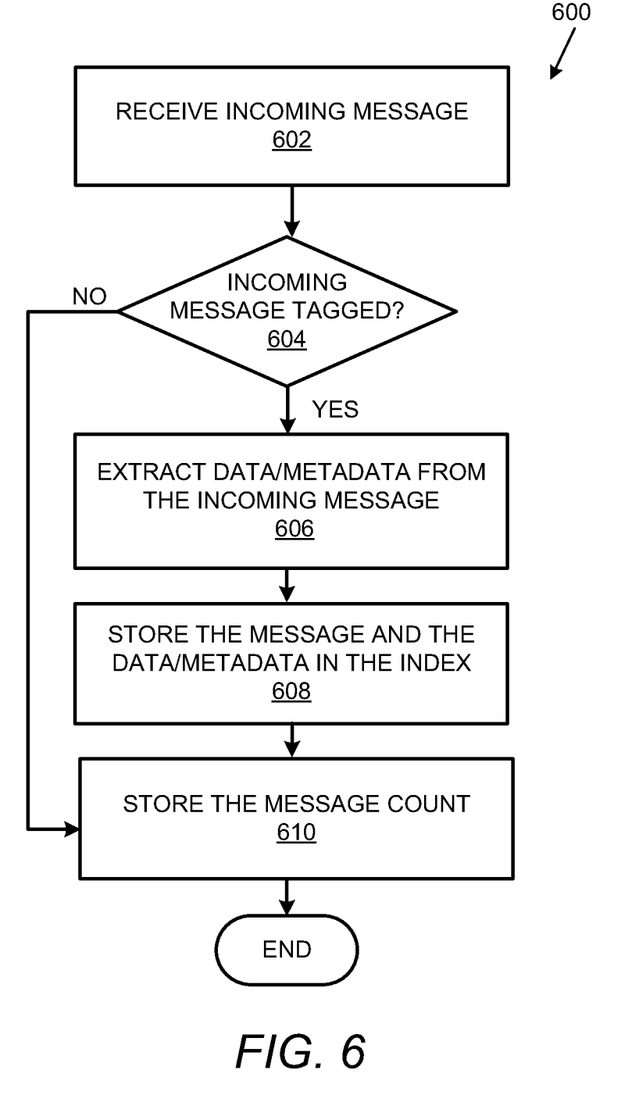
FIG. 6 shows a flowchart that details a method of building an index from incoming messages in accordance with the examples disclosed herein.

FIG. 6 shows a flowchart that details a method of building the index 104 from incoming messages in accordance with the examples disclosed herein. At 602, an incoming message is received from an external system. The external system can include a user device that is disparate and/or remote from the user device receiving the incoming message. At 604, it is determined if the incoming message is tagged with a message count. In an example, the metadata of the incoming message can be examined to identify the tag. If the incoming message is tagged, the incoming message is processed at 606 for the extraction of keywords as detailed above. If the incoming message is not tagged, the process is terminated on the end block. In an example, the incoming message 132 can be processed to extract keywords including nouns, verbs in addition to named entity extraction, sentiment tagging, etc. The incoming message 132 in its entirety along with the extracted information (i.e., the data/metadata 144) is stored in the index 104. Also, the tag 1322 along with the count is stored in the index at 610.

Figure 7:
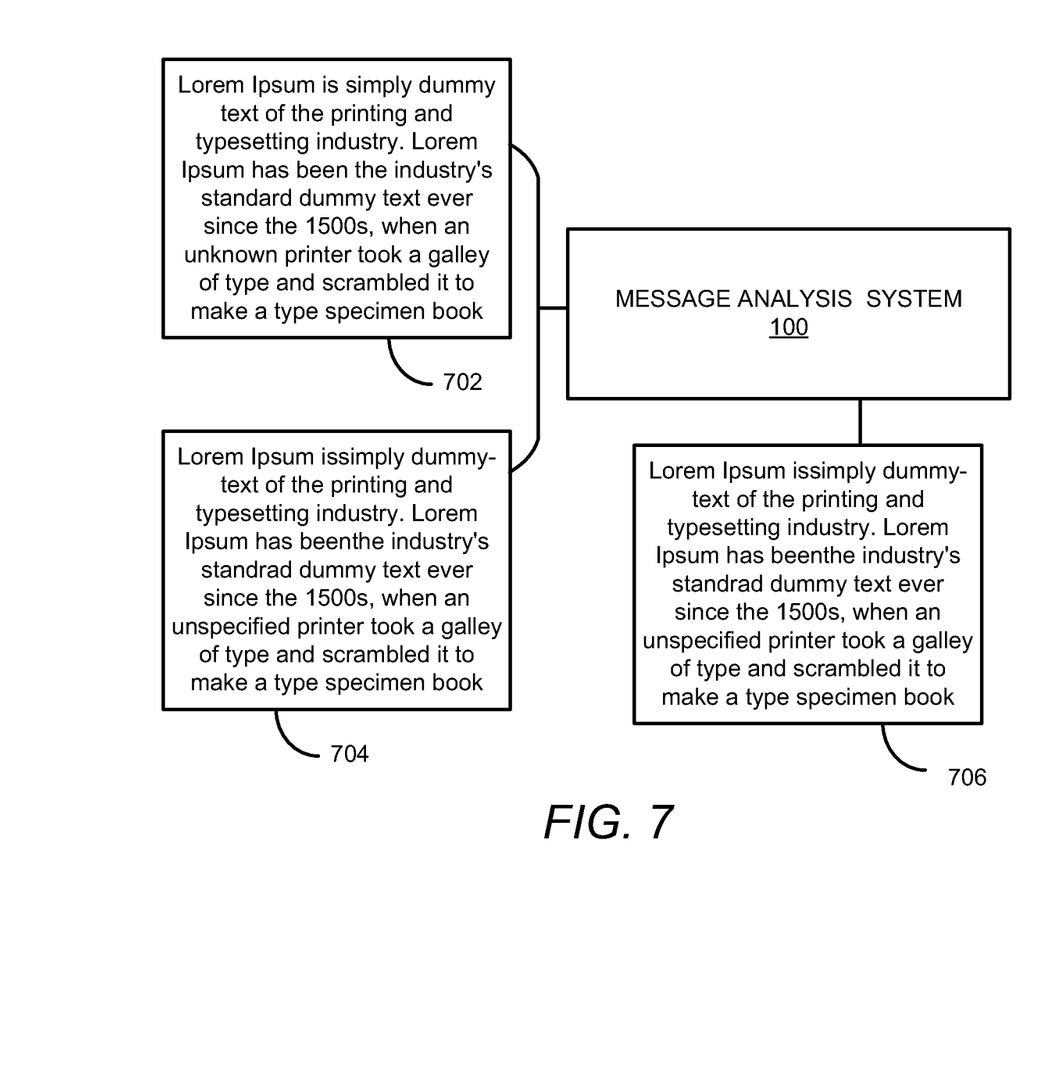
FIG. 7 shows the identification of duplication of confidential information in accordance with the examples disclosed herein.

FIG. 7 shows the identification of duplication of confidential information in accordance with the examples disclosed herein. Initially, a message 702 is received from a message provider P1 including the text, "Lorem Ipsum is simply dummy text of the printing and typesetting industry. Lorem Ipsum has been the industry's standard dummy text ever since the 1500$s$, when an unknown printer took a galley of type and scrambled it to make a type specimen book." A copy 704 of the message 702 with similar text but slight differences is also received. The copy 704 includes text, "Lorem Ipsum issimply dummy-text of the printing and typesetting industry. Lorem Ipsum has beenthe industry's standrad dummy text ever since the 1500$s$, when an unspecified printer took a galley of type and scrambled it to make a type specimen book." When compared with the message 702 the copy 704 may include differences at "issum", "beenthe", etc. In different instances, the copy 704 may be received from the same message source as 702 or a different message source. In either case, the message 702 and the copy 704 are analyzed by the message analysis system 100 and they are stored to the index 104 along with their data/metadata 144. Simple string matches may not identify copy 704 as a forward/copy of the message 702. However, the sub-string analyzer 402, the semantic similarity analyzer 404 of the message index verifier 304 enable the identification of copy 704 as similar to message 702.

A user who receives the message 702 and/or copy 704 may attempt to share the message 702/copy 704 with other users by copying or typing the message/copy 704 or capturing a screenshot 706 of the copy 704. Screenshot 706 is analyzed by the image message analyzer 206 for text extraction and comparison with the contents of the index 104. The contents of screenshot 706 are identified as similar to the index contents and accordingly, the count of copies of the message 702 is updated and compared with a predetermined count threshold message tag processor 208. In case the message count is less than the count threshold, the message count is updated and included in a message with screenshot 706. If the message count is greater than the count threshold the message transmission is suppressed and the message is not transmitted to the message recipients.

Figure 8:
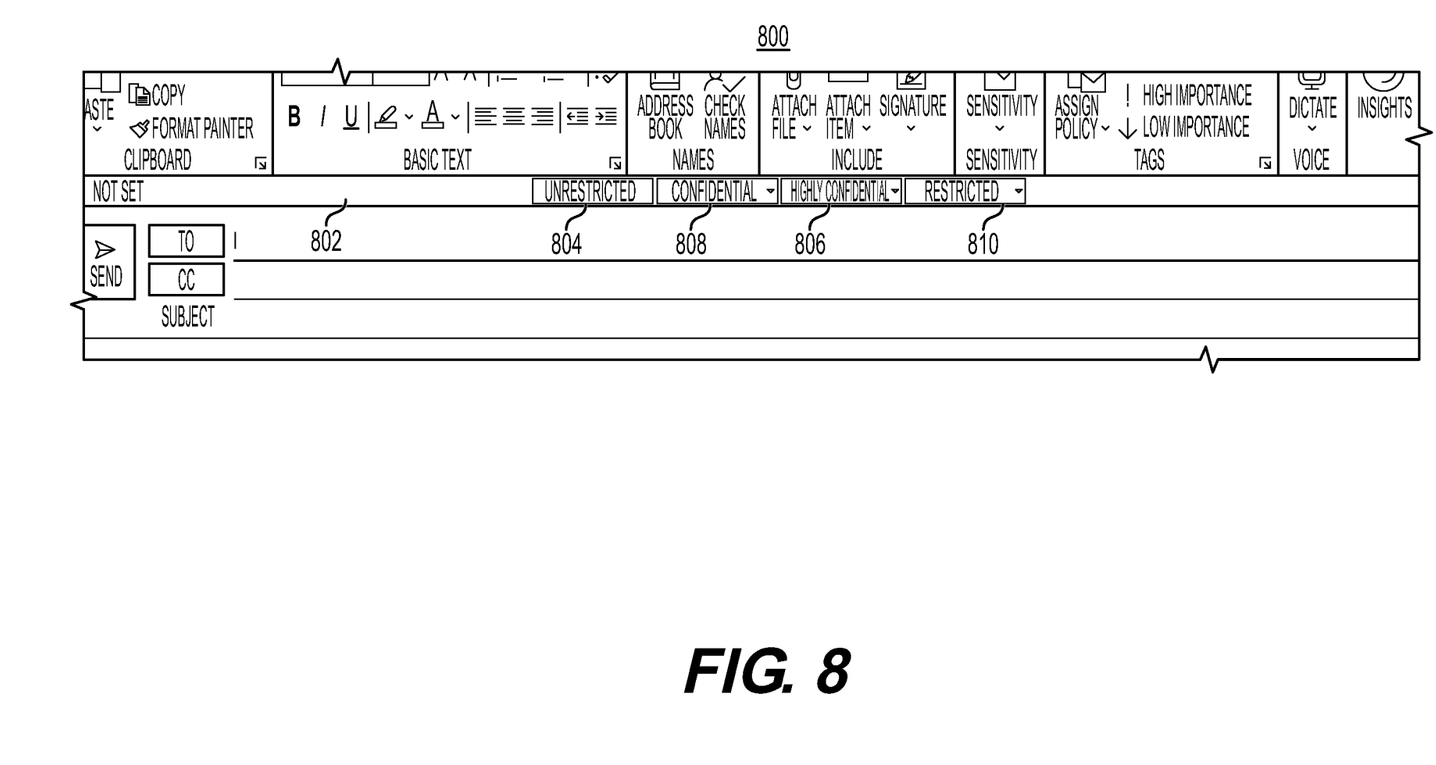
FIG. 8 shows an example of an email message with metadata indicative of protected content in accordance with the examples disclosed herein.

FIG. 8 shows an example of an email message 800 with metadata indicative of protected content in accordance with the examples disclosed herein. For example, the application being used to generate the email message 800 includes a toolbar 802 which enables setting message confidentiality to unrestricted 804, highly confidential 806, confidential 808, restricted 810, etc. Based on the rating associated with the different messages, the message analysis system 100 can include rules for updating message counts, setting and maintaining count thresholds, and messages may be forwarded or held back based on the count threshold.

Figure 9:
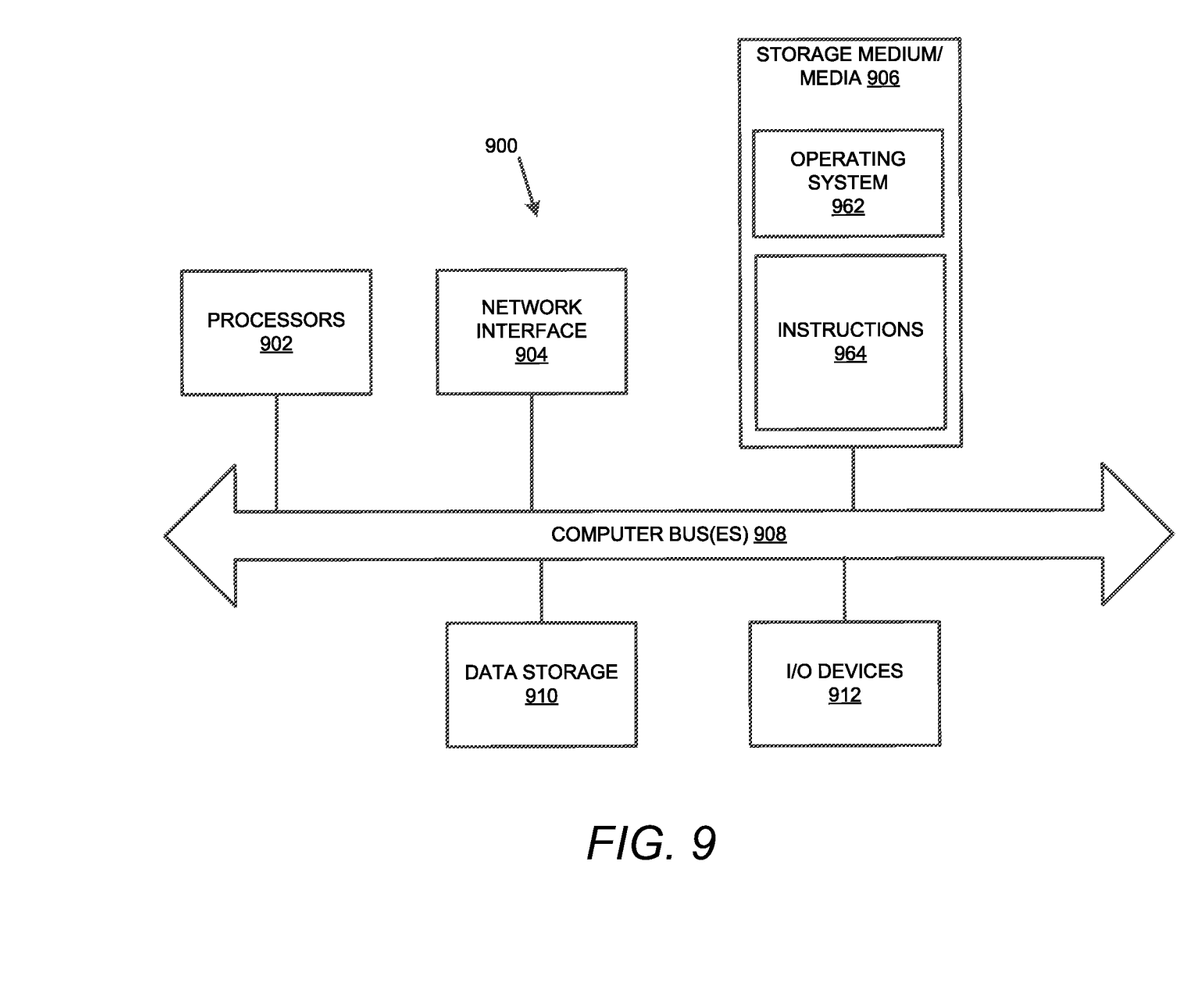
FIG. 9 illustrates a computer system that may be used to implement the message analysis system in accordance with the examples disclosed herein.

FIG. 9 illustrates a computer system 900 that may be used to implement the message analysis system 100. More particularly, computing machines such as desktops, laptops, smartphones, tablets, and wearables which may be used to generate or access the data from the message analysis system 100 may have the structure of the computer system 900. The computer system 900 may include additional components not shown and that some of the process components described may be removed and/or modified. In another example, a computer system 900 can sit on external-cloud platforms such as Amazon Web Services, AZURE® cloud or internal corporate cloud computing clusters, or organizational computing resources, etc.

The computer system 900 includes hardware processor(s) 902, such as a central processing unit, ASIC or another type of processing circuit, input/output devices 912, such as a display, mouse keyboard, etc., a network interface 904, such as a Local Area Network (LAN), a wireless 802.11x LAN, a 3G, 4G or 5G mobile WAN or a WiMax WAN, and a processor-readable medium 906. Each of these components may be operatively coupled to a bus 908. The computer-readable medium 906 may be any suitable medium that participates in providing instructions to the processor(s) 902 for execution. For example, the processor-readable medium 906 may be a non-transitory or non-volatile medium, such as a magnetic disk or solid-state non-volatile memory or volatile medium such as RAM. The instructions or modules stored on the processor-readable medium 906 may include machine-readable instructions 964 executed by the processor(s) 902 that cause the processor(s) 902 to perform the methods and functions of the message analysis system 100.

The message analysis system 100 may be implemented as software stored on a non-transitory processor-readable medium and executed by one or more processors 902. For example, the processor-readable medium 906 may store an operating system 962, such as MAC OS, MS WINDOWS, UNIX, or LINUX, and code 964 for the message analysis system 100. The operating system 962 may be multi-user, multiprocessing, multitasking, multithreading, real-time, and the like. For example, during runtime, the operating system 962 is running and the code for the message analysis system 100 is executed by the processor(s) 902.

The computer system 900 may include a data storage 910, which may include non-volatile data storage. The data storage 910 stores any data used by the message analysis system 100. The data storage 910 may be used to store the index 104, the outgoing messages, and other data that is used or generated by the message analysis system 100 during operation.

The network interface 904 connects the computer system 900 to internal systems for example, via a LAN. Also, the network interface 904 may connect the computer system 900 to the Internet. For example, the computer system 900 may connect to web browsers and other external applications and systems via the network interface 904.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

What is claimed is:

1. A message analysis system, comprising:
   at least one processor;
   a non-transitory processor-readable medium storing machine-readable instructions that cause the processor to:
   detect an outgoing message to be transmitted to one or more message recipients;
   identify a format of the outgoing message, where the format can include one of a textual format and a non-textual format;
   determine textual content of the outgoing message based on the identified format;
   compare the textual content of the outgoing message with contents of an index that include prior tagged messages, textual content extracted from the prior tagged messages, message counts, and count thresholds of the prior tagged messages,
      wherein to compare the textual content of the outgoing message with the contents of the index, the processor is to check via string comparison functions if the outgoing message has an exact match in the prior tagged messages included in the index;
   determine that an extent of match between the textual content of the outgoing message and matching contents of the index exceed a predetermined match threshold;
   tag the outgoing message with an updated count based on an associated message count of at least one prior tagged message from the matching contents, wherein the message count includes a number of messages that were transmitted in a message chain preceding the outgoing message;
   transmit the message if the updated count of the outgoing message is less than or equal to a corresponding count threshold of the at least one prior tagged message; and
   suppress transmission of the message if the updated count of the outgoing message is greater than the corresponding count threshold.

2. The message analysis system of claim 1, wherein the processor is to further:
   determine if an incoming message includes a count tag.

3. The message analysis system of claim 2, wherein if the incoming message includes the count tag the processor is to further:
   extract data including one or more of words, phrases, and sentiments expressed in the incoming message by parsing the incoming message.

4. The message analysis system of claim 3, wherein the processor is to further:
   update the index with the data extracted from the incoming message.

5. The message analysis system of claim 1, wherein to identify the format of the outgoing message, the processor is to further:
   detect by an operating system of a user device employed to transmit the outgoing message, at least one of typing and copy-paste operations executed to generate the outgoing message.

6. The message analysis system of claim 1, wherein to identify the format of the outgoing message, the processor is to further:
   detect a screen capture operation by an operating system of a user device employed to transmit the outgoing message.

7. The message analysis system of claim 6, wherein to identify the format of the outgoing message, the processor is to further:
   identify that the outgoing message has a voice format.

8. The message analysis system of claim 6, wherein to identify the format of the outgoing message, the processor is to further:
   identify that the outgoing message has an image format.

9. The message analysis system of claim 8, wherein to determine the textual content of the outgoing message having the image format, the processor is to further:
   execute optical character recognition (OCR) on the outgoing message for extracting the textual content of the outgoing message.

10. The message analysis system of claim 8, wherein to determine the textual content of the outgoing message having the image format, the processor is to further:
identify one or more textual objects from the outgoing message by one or more object recognition models.

11. The message analysis system of claim 1, wherein if the outgoing message has no exact match, to compare the textual content of the outgoing message with the contents of the index, the processor is to:
further check for substring matches with the string comparison functions, wherein one or more of the prior tagged messages retrieved from the index include substrings included in the outgoing message.

12. The message analysis system of claim 1, wherein to compare the textual content of the outgoing message with the contents of the index when neither the exact match nor the substring matches are identified, the processor is to:
determine a semantic similarity between the outgoing message and the contents of the index.

13. The message analysis system of claim 1, wherein to determine that the extent of match between the textual content of the outgoing message and the matching contents of the index exceed the predetermined match threshold, the processor is to:
retrieve the predetermined match threshold from rules for messages being transmitted by an application associated with the outgoing message.

14. A method of analyzing messages, comprising:
identifying a tag with a message count from contents of an incoming message;
saving the incoming message along with data and metadata associated with the incoming message to an index, wherein contents of the index include prior tagged messages and data extracted from the prior tagged messages wherein the data for each of the prior tagged messages includes a message count and a count threshold where the message count for the prior tagged message includes number of copies of the prior message that were transmitted and the count threshold includes a number of the prior message copies that are permitted to be transmitted;
detecting a user action generating a new message;
identifying a format of the new message and extracting text included in the new message based on the format;
initially determining if the new message is an exact match of a prior tagged message included in the index by checking via string comparison functions if the new message has an exact match in prior tagged messages included in the index;
determining a semantic similarity match between the incoming message and the contents of the index if none of the prior messages are an exact match or a substring of the new message;
updating message count of at least one of the prior messages that bears a semantic similarity with the new message, a semantic similarity greater than a semantic similarity threshold;
determining if the updated message count of the new message is greater than a message threshold associated with a message thread;
transmitting the new message with a tag including the updated message count if the updated message count is less than the message threshold; and
preventing transmission of the new message if the updated message count is greater than the count threshold.

15. The method of claim 14, wherein saving the incoming message to the index further includes further comprising:
extracting textual data from the incoming message.

16. The method of claim 15, further comprising:
determining a format of the incoming message, wherein the format of the incoming message is selected from one of a textual format or a non-textual format.

17. The method of claim 16, wherein the non-textual format includes one of an image format and a voice format.

18. A non-transitory processor-readable storage medium comprising machine-readable instructions that cause a processor to:
detect that an outgoing message is to be transmitted;
identify a format of the outgoing message, where the format can include one of a textual format and a non-textual format;
determine textual content of the outgoing message based on the identified format;
compare the textual content of the outgoing message with contents of an index that includes prior tagged messages, strings extracted from the prior tagged messages, message counts, and count thresholds associated with each of the prior tagged messages,
wherein to compare the textual content of the outgoing message with the contents of the index, the processor is to check via string comparison functions if the outgoing message has an exact match in the prior tagged messages included in the index;
determine that an extent of match between the textual content of the outgoing message and at least one of the prior tagged messages from the index exceeds a predetermined match threshold;
tag the outgoing message with an updated count based on a message count of the at least one prior tagged message;
transmit the message if the updated count of the outgoing message is less than an associated count threshold of the at least one prior tagged message; and
suppress transmission of the message if the updated count of the outgoing message is greater than the associated count threshold.

19. The non-transitory processor-readable storage medium of claim 18, further comprising instructions that cause the processor to:
detect, by an operating system of a user device employed to transmit the outgoing message, at least one of typing, copy-paste, and a screen capture operation executed to generate the outgoing message.

* * * * *